(12) United States Patent
Fidlow

(10) Patent No.: US 10,040,531 B1
(45) Date of Patent: Aug. 7, 2018

(54) WATERBORNE VESSEL BRAKING SYSTEM AND METHOD

(71) Applicant: Hal Fidlow, Cranford, NJ (US)

(72) Inventor: Hal Fidlow, Cranford, NJ (US)

( * ) Notice: Subject to any disclaimer, the term of this patent is extended or adjusted under 35 U.S.C. 154(b) by 3 days.

(21) Appl. No.: 15/428,564

(22) Filed: Feb. 9, 2017

(51) Int. Cl.
| | | |
|---|---|---|
| *B63H 21/17* | (2006.01) | |
| *B63H 5/08* | (2006.01) | |
| *B63H 23/24* | (2006.01) | |
| *H02P 3/10* | (2006.01) | |
| *H02P 7/08* | (2006.01) | |

(52) U.S. Cl.
CPC .............. *B63H 21/17* (2013.01); *B63H 5/08* (2013.01); *B63H 23/24* (2013.01); *H02P 3/10* (2013.01); *H02P 7/08* (2013.01); *B63B 2755/00* (2013.01); *B63H 2023/245* (2013.01)

(58) Field of Classification Search
CPC .......... B63H 21/17; B63H 5/08; B63H 23/24; H02P 7/08; H02P 3/10
See application file for complete search history.

(56) References Cited

U.S. PATENT DOCUMENTS

| | | | | |
|---|---|---|---|---|
| 1,655,470 A * | 1/1928 | MacMillan | ............ | B63H 23/24 318/261 |
| 5,041,029 A * | 8/1991 | Kulpa | ................ | B63B 43/20 114/144 B |
| 5,202,835 A * | 4/1993 | Knight | ................ | G05D 1/0206 114/144 E |
| 5,863,228 A * | 1/1999 | Tether | ................ | B60L 8/00 440/3 |
| 6,986,688 B1 * | 1/2006 | Jansen | ................ | B63H 20/007 440/1 |
| 8,888,542 B2 * | 11/2014 | Kinpara | ................ | B63H 20/00 440/1 |
| 9,163,607 B2 * | 10/2015 | Tabe | ................ | F03B 13/262 |
| 9,819,296 B2 * | 11/2017 | Bailey | ................ | H02P 25/188 |
| 2007/0051292 A1 * | 3/2007 | Kilbourn | ................ | B63B 35/00 114/311 |
| 2012/0001479 A1 * | 1/2012 | Harpin | ................ | B63H 21/17 307/9.1 |
| 2012/0094555 A1 * | 4/2012 | Calverley | ................ | B63H 23/24 440/6 |

* cited by examiner

*Primary Examiner* — Sean Gugger
(74) *Attorney, Agent, or Firm* — Stuart M. Goldstein

(57) ABSTRACT

A braking system for waterborne propeller driven vessel which, upon activating a brake pedal or similar actuation device causes the vessel to almost immediately stop its forward movement. The system initiates a burst of highly amplified horsepower and torque, created by a controlled pulse of electrical power released from a bank of fully charged ultracapacitors. This pulse of electrical power is sent directly to AC induction-driven motors, causing oversized propellers to immediately rotate astern, thereby generating a reverse thrust in opposition to the vessel's forward movement sufficient to stop the vessel. The horsepower and torque produced by the braking system and operation of the present invention will also cause the oversize propellers to transmit this tremendous power into the water, without cavitation, to assist in stopping vessel movement.

7 Claims, 4 Drawing Sheets

WATERBORNE VESSEL BRAKING SYSTEM AND METHOD

FIELD OF THE INVENTION

The present invention relates to waterborne vessel propulsion and specifically a braking system and method for immediately stopping the forward movement of propeller-driven vessels.

BACKGROUND OF THE INVENTION

Crowded shipping lanes, busy ports, and congested marinas invite collisions between all types of vessels. In fact, every year boating accidents result in property damage, personal injury, and even death. There have been braking methods suggested for jet propelled watercraft and for reducing the speed of propulsion vessels using astern propellers acting in conjunction to slow down moving vessels. However, there is no effective braking system for propeller-driven vessels which will almost immediately, or within seconds, stop the forward movement of the vessel upon the activation of a brake pedal or similar actuating device. Implementation of such a braking system would be extremely beneficial in reducing collisions between watercraft and piers, underwater pipelines, and other structures located in vessel trafficking navigable waters.

SUMMARY OF THE INVENTION

It is thus the object of the present invention to provide a braking system for waterborne propeller driven vessels which permits a vessel captain to simply activate a brake pedal or similar actuation device to suddenly and almost immediately stop the forward movement of the vessel.

The present invention contemplates redesigning a vessel's propulsion system to initiate a burst of highly amplified horsepower and torque, created by a controlled pulse of electrical power released from a bank of fully charged ultracapacitors. This pulse of electrical power is sent directly to AC induction-driven motors causing oversized propellers to immediately rotate astern, thereby generating a reverse thrust in opposition to the vessel's forward movement sufficient to stop the vessel. The horsepower and torque produced by the braking system and operation of the present invention will also cause the oversize propellers to transmit this tremendous power into the water, without cavitation, to assist in stopping vessel movement.

Critical to the operation of the braking system is the use of ultracapacitors. These electrical devices have the capability of storing a large amount of energy in an electrical field. They can discharge that energy in rapid short bursts and they can be charged much faster as well. Ultracapacitors can be discharged and charged numerous times during the life of the device. As a result, they are perfect for providing the tremendous, short bursts of electrical energy required in the braking system of the present invention.

Novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
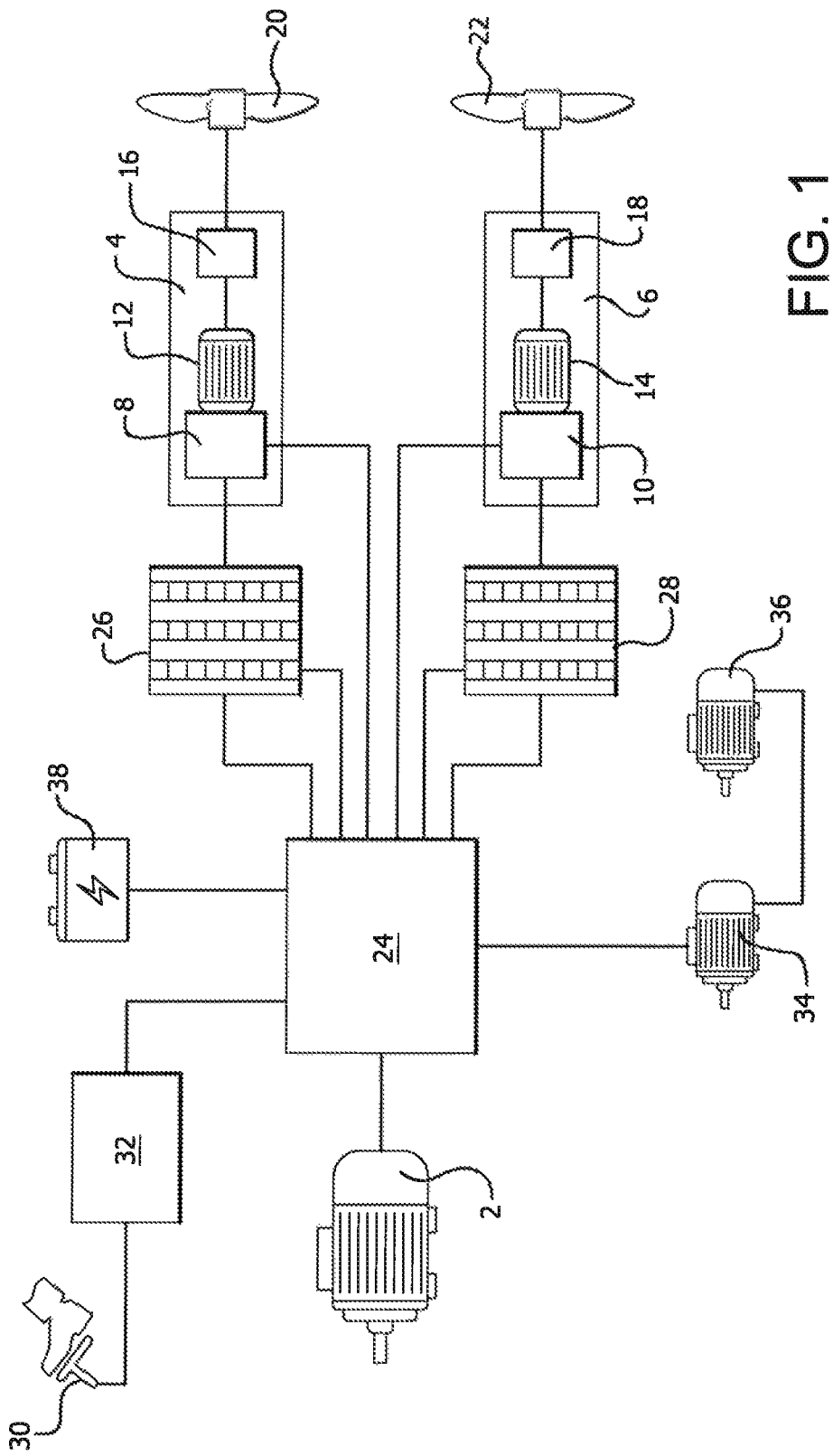
FIG. 1 is a schematic representation of the waterborne vessel braking system of the present invention.

The waterborne vessel braking system of the present invention comprises several primary components, including main generator 2; AC, induction drive units 4 and 6, which include induction motor inverters 8 and 10, induction drive motors 12 and 14, and propeller gear boxes 16 and 18 connected to rotate propellers 20 and 22; computer processor 24; and, most importantly, high current ultracapacitor banks 26 and 28, the high capacity electrical current means critical to this system.

Main generator 2 supplies all the electrical power to induction drive units 4 and 6 also all electric power to the vessel operations under normal cruising conditions. Significantly, main generator 2 provides electrical current to induction drive units 4 and 6 which operate to rotate propellers 20 and 22 under normal cruise conditions, i.e. when the vessel's propellers are rotating for routine forward movement and astern movement of the vessel. These movements are controlled form the vessel's bridge, through computer processor 24, as is common in the art. In accordance with the invention, computer processing means, herein referred to as computer processor 24, is also programmed to send the appropriate signals to direct ultracapacitors 26 and 28 to provide short, but tremendously high bursts of electrical current during the braking process, as is detailed hereinafter.

Integral to the system of the present invention is brake pedal or equivalent brake actuation means, actuation device 30, which is activated to begin the vessel braking process. Pedal positon switch 32 is utilized to send the braking signal from brake pedal 30 to computer processor 24.

Auxiliary components which provide assistance for the operation of the vessel and provide back-up for component failures and emergencies include back up generator 34, which provides electrical power to computer processor 24, auxiliary generator 36, providing back up to generator 34, and lithium-ion battery or equivalent 38, provided to allow the vessel to maneuver at low speeds in calm waters with all noise and pollution generating engines switched off. All high power consumption vessel operation, such as open ocean cruising, requires electrical power supplied by main generator 2.

Figure 2:
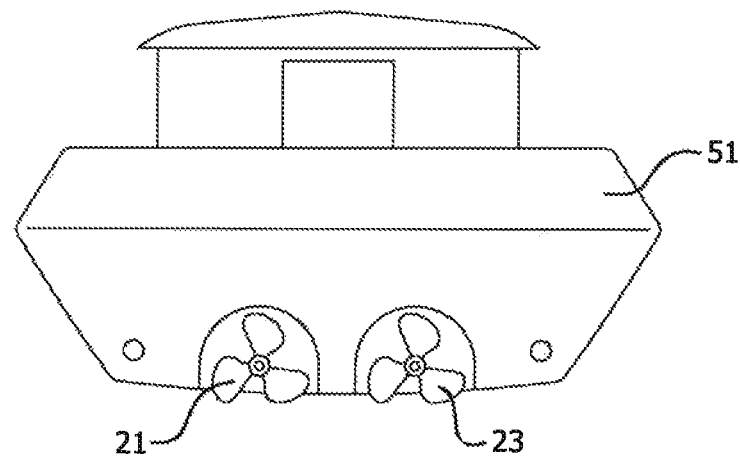
FIG. 2 is a non-scale representation of a traditional vessel showing propeller size to hull size.
Figure 3:
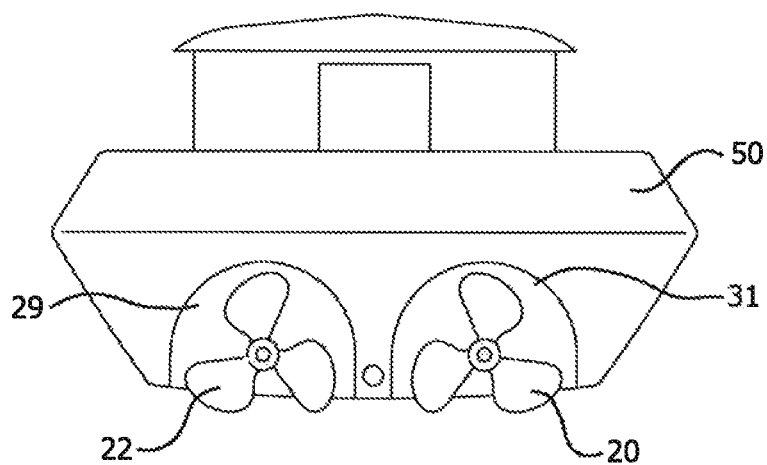
FIG. 3 is a non-scale representation of a vessel in accordance with the present on showing oversize propeller to hull size.

The propellers of the these vessels must utilize far larger propellers relative to boat size and mass, since a great amount of energy must be transmitted into the water in order to stop the vessels quickly. FIGS. 2 and 3 are non-scale representations of the size of the required propellers for the present invention compared to propellers of similarly sized vessels. Traditional vessel 51 comprises standard propellers 21 and 23. Vessel 50, which contains the braking system of the present invention, utilizes oversize propellers 20 and 22. Propeller drive tunnels 25 and 27 on traditional vessels will be replaced by enlarged tunnels 29 and 31 in order to accommodate the oversize propellers.

The operation of the braking system begins when the forward movement of the vessel needs to be quickly and fully stopped because of a pending emergency or equivalent situation. Brake pedal 30 is initially activated in order to stop the vessel's movement. The following events then occur simultaneously or in as rapid a sequence as possible:

Pedal positon switch 32 sends the appropriate signal to computer processor 24. Upon receiving the command signal for the computer processor, motor inverters 8 and 10 deliver maximum electrical current to induction motors 12 and 14, thereby reversing the direction of the induction drive motors. Computer processor 24 also immediately sends signals to ultracapacitors 26 and 28 to switch to their "electrical current dump" modes. Generators 2, 34, and 36 immediately go to open wide throttle (maximum power) and the generator inverters for each of the generators synchronize their respective sine waves.

Lithium-ion battery 38 is directly connected to the vessel's peripheral systems inverters and provides temporary electricity for other vessel services.

Extraordinary bursts of electrical current are directed from ultracapacitors 26 and 28, through the ultracapacitors' bleeder resistor banks through motor inverters 8 and 10, powering induction motors 12 and 14. Propellers 20 and 22 are caused to rotate at high speed in the astern direction, generating a reverse thrust which produces a tremendous force against the vessel's forward movement. It is it is contemplated that ultracapacitors 26 and 28 would generate at least 14 megawatts of electricity, delivering 18,372 horsepower during a nine second period.

Figure 4:
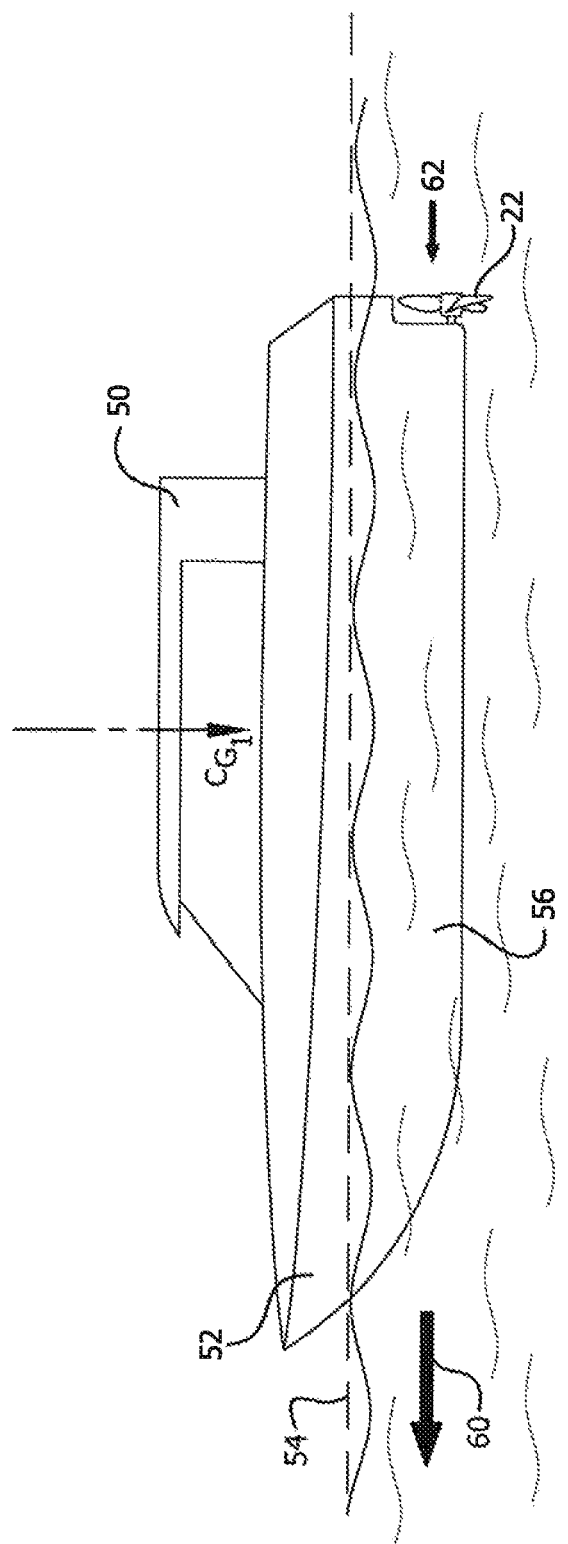
FIG. 4 is a representation of a vessel traveling forward in the water, prior to activation of the braking system of the present invention.
Figure 5:
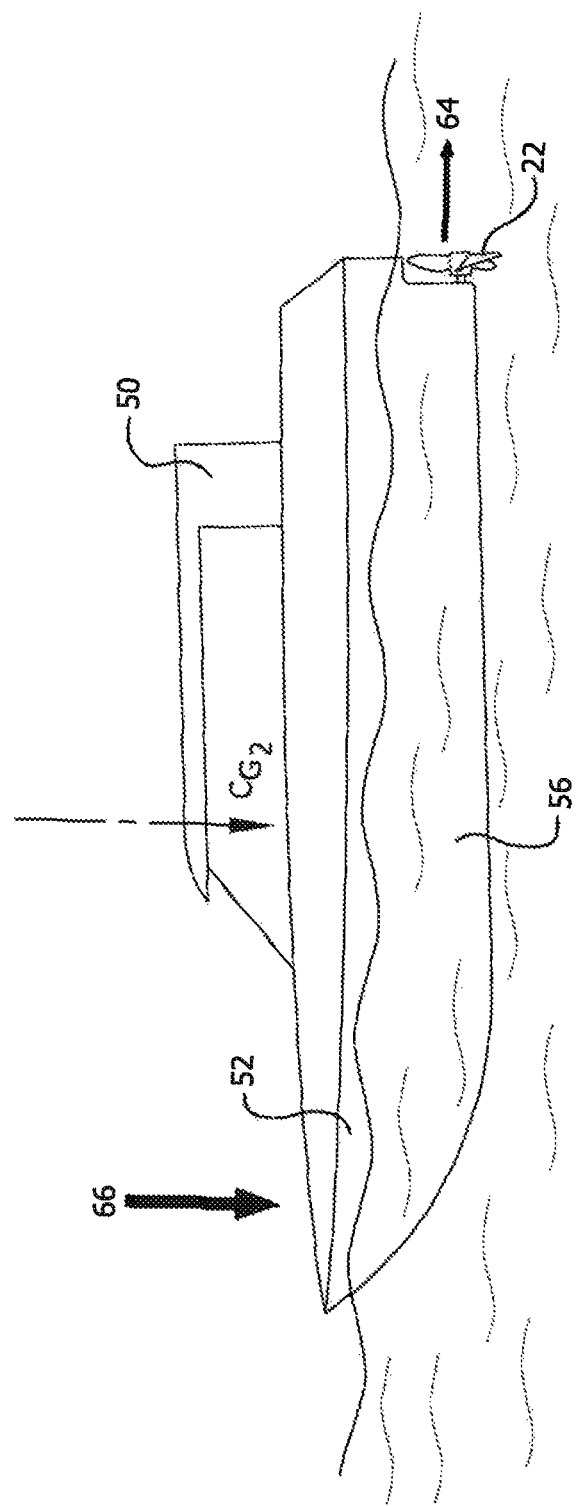
FIG. 5 is a representation of the effect to a vessel in the water, following activation of the braking system of the present invention.

Having received the short, but extreme burst of electricity from ultracapacitors 26 and 28, the tremendous thrust generated by the rotation of propellers 20 and 22, which reverse rotation from propelling vessel 50 forward 62 to propelling it astern 64, results in forward movement 60 of the vessel to be very rapidly reduced. This causes an immediate drop 66 of the vessel's bow 52 off of its normal horizontal cruising plane 54 and shifts the vessel's normal center of gravity CG1 forward to CG2, thereby pushing the vessel's hull 56 down hard into the water. See FIGS. 4 and 5. This greatly increases vessel drag, as propellers 20 and 22 continue to rotate in reverse, in the astern direction, against the forward movement of the vessel. Vessel 50 suddenly loses all forward momentum and comes to a complete stop.

Once ultracapacitors 26 and 28 are discharged, computer processor 24 switches off the ultracapacitor bank relays from induction motors 12 and 14. Normal control system functions are restored to all vessel stations.

Post braking activities include the reconnection of electrical power from generator 2 to induction motor inverters 8 and 10 and induction motors 12 and 14. Computer processor 24 signals the vessel's auxiliary cooling systems to rapidly bring induction motors 12 and 14, motor inverters 8 and 10, ultracapacitors 26 and 28, including ultracapacitor banks and ultracapacitor bleeder resistors, back down to normal operating temperatures as quickly as possible, so that the braking system can be used again should the need arise.

At this time, computer processor 24 begins analyzing the braking system for signs of damage or malfunction. A signal light or other alarm illuminates at all vessel stations to provide notice that the braking system is temporary unavailable. The time required until ultracapacitor banks are charged enough to enable the braking system to be energized again are also displayed. Additionally, computer processor 24 monitors ultracapacitor charge level as well as component temperatures and other metrics to indicate when the braking system is enabled or to provide notification that the ultracapacitors are sufficiently charged and components have cooled enough to use the system again.

Generators 2, 22, and 24 remain at full throttle for the purpose of recharging ultracapacitors 26 and 28, until they are charged enough to power a second emergency stop when needed. The generators slow down to normal cruising speed when ultra capacitors are fully charged.

The ultracapacitor banks must be calibrated to set the length of time of the burst of energy to allow the ultracapacitor banks to discharge for the required period of time, for example nine seconds. The burst is to be tuned to the intended application by adjusting the length of the discharge time from the ultracapacitor banks to rotate a given vessel's oversized propellers backwards with a great enough force to bring the vessel to a complete stop quickly.

The ultracapacitor banks and bleeder resisters also must be designed to store electrical power in such a way that allows the release of a short, but very intense burst of electrical power. This also enables the AC induction motor drive system to rotate the oversize propellers backwards against the vessel's forward momentum with enough force to bring the boat to a stop in only a few seconds.

It is contemplated that the braking system actuator can be an actual brake pedal added to the vessel's operating station. This brake pedal could also be programed to activate other systems for legal or safety reasons, such as photographing automatic digital pictures, activating air horns, calling the U.S. Coast Guard, playing a pre-recorded message to passengers over a PA system, etc.

The brake pedal system can be further modified so that it s utilized for non-emergencies, such as to assist the vessel's captain when the brake pedal operation is to be progressive. Programming the brake pedal to mimic the operation of an automobile can be achieved through software that recharges the lithium-ion battery similar to the manner in which the Tesla® brake pedal operates.

Major engine layout modifications would be required, since the vessel's engines will now drive generators instead of rotating a propeller mechanically. If the vessel's main generator fails, the vessel will not be stranded, as it would be with traditional mechanical drives; since the back-up generators could synchronize their inverter's sine waves to supply power to both AC induction drives simultaneously. Thus, vessel engineers will have greater flexibility to locate major components, as engines will no longer be mechanically coupled to propellers. Maximum vessel power and speed can be fine-tuned with one very large engine driving AC induction motors versus the traditional two engine mechanical arrangement. Vessels designed in this manner will have higher horsepower to weight ratios than those with the traditional drives and will ultimately produce a higher top speed.

The braking system of the invention will require additional cooling systems dedicated to cooling the ultracapacitor and other components which are prone to overheating. Vessels will also require reinforced bulkheads, oversized thrust bearings, enhanced fire suppression systems, and possibly passenger restraint systems.

Since the vessel's new design has oversized propellers and AC induction motors, the electronics can be configured to allow tidal or ocean currents to rotate the propellers and induction motors to generate the vessel's own power when the vessel is tied in a slip or in an active water flow, such as is found in marinas located in rivers. Under certain conditions, vessels at anchor at sea will also be able to generate significant electric power.

It is contemplated that the waterborne vessel braking system of the present invention is to be used on vessels of approximately 55 feet in length. However, the system can be adapted for vessels of any size, from personal water craft to yachts, to race boats, to full size cruise and naval ships. System components will, need to be custom designed to fit vessels of these sizes.

Certain novel features and components of this invention are disclosed in detail in order to make the invention clear in at least one form thereof However, it is to be clearly understood that the invention as disclosed is not necessarily limited to the exact form and details as disclosed, since it is apparent that various modifications and changes may be made without departing from the spirit of the invention.

The invention claimed is:

1. A propeller driven waterborne vessel comprising:
   an electric induction drive motor for powering at least one propeller of the vessel to rotate in a first direction for routine forward movement of the vessel and for powering the propeller to rotate in a second direction, opposite to the first direction, for routine astern movement of the vessel;
   processing means for controlling the forward and astern movement of the vessel;
   a motor inverter for reversing the direction of the motor;
   an electric generator for supplying electricity, including supplying maximum electric current, to the motor and motor inverter;
   a vessel braking system comprising:
      high capacity electrical current means for supplying intense bursts of electricity to the motor unrelated to the supplying of the maximum electric current to the motor and motor inverter;
      actuating means solely for initiating the braking system independent from affecting the routine astern movement of the vessel wherein the rotation of the propeller in the first direction for forward movement of the vessel is reversed to rotate the propeller in the second direction at high speed to rapidly reduce and ultimately stop the forward movement of the vessel and wherein the processing means receives input from the actuating means to control the direction of the motor inverter, motor and the propeller and for monitoring and controlling electricity, including the maximum electrical current and the high capacity electrical current means, from the generator and the electric current means to the motor;
   whereby upon activating the actuating means, the processing means directs the maximum electrical current to the motor to reverse the direction of the motor powering the propeller in the first direction and also simultaneously initiates a separate, intense burst of electricity from the high capacity electrical current means to the motor powering the motor to immediately cause the propeller to rotate at the high speed in the second direction, thereby generating a reverse thrust in opposition to the vessel's forward movement sufficient to stop the vessel.

2. The waterborne vessel as in claim 1 wherein the propeller is oversized relative to the mass of the vessel.

3. The waterborne vessel as in claim 1 wherein the current means comprises at least one high electric current ultracapacitor.

4. The waterborne vessel as in claim 1 wherein the vessel comprises dual propellers which rotate in a first direction for forward movement of the vessel and which rotate in a second direction, opposite to the first direction, for astern movement of the vessel, and one electric induction drive motor to power each of the propellers.

5. The process of braking propeller driven waterborne vessels comprising the steps of:
   providing a vessel with at least one propeller which rotates in a first direction for routine forward movement of the vessel and which rotates in a second direction, opposite to the first direction, for routine astern movement of the vessel;
   providing an electric induction drive motor for powering the propeller of the vessel in said first and second directions;
   providing an electric generator for supplying electricity, including supplying maximum electrical current, to the motor;
   providing a high current ultracapacitor for supplying intense bursts of electricity to the motor unrelated to the supplying of the maximum electrical current to the motor and motor inverter;
   providing a brake actuator solely for initiating the braking of the vessel independent from affecting the routine astern movement of the vessel;
   powering the propeller, by means of the motor, to rotate in the first direction for forward movement of the vessel;
   activating the brake actuator to begin the braking process;
   upon activating the brake actuator, supplying the maximum electrical current from the generator to the motor to reverse the rotation of the propeller rotating in the first direction for forward movement of the vessel to the rotation of the propeller in the second direction;
   upon activating the brake actuator and simultaneously with the supplying of maximum electric current, supplying an intense burst of electric current from the ultracapacitor to the motor;
   powering the motor with the intense burst of electric current;
   causing the motor to rapidly rotate the propeller in the second direction at high speed, thus
   generating a reverse thrust in opposition to the vessel's forward movement sufficient to stop the vessel.

6. The process of braking propeller driven waterborne vessels as in claim 5 further comprising the step of:
   providing processing means for receiving input from the brake actuator to control the direction of the motor.

7. The process of braking propeller driven waterborne vessels as in claim 5 comprising the step of:
   providing computer processing means for receiving input from the actuating means to control the direction of the motor and for monitoring and controlling electricity from the generator and the ultracapacitor to the motor.

\* \* \* \* \*